US011665796B2

(12) United States Patent
Stimac et al.

(10) Patent No.: US 11,665,796 B2
(45) Date of Patent: May 30, 2023

(54) MULTI-PURPOSE VOICE ACTIVATED LIGHTING APPARATUS

(71) Applicant: SAVANT TECHNOLOGIES LLC, East Cleveland, OH (US)

(72) Inventors: Tomislav Stimac, East Cleveland, OH (US); Nicholas Castorano, East Cleveland, OH (US); Zhiyong Wang, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 83 days.

(21) Appl. No.: 16/635,550

(22) PCT Filed: Aug. 8, 2017

(86) PCT No.: PCT/CN2017/096411
§ 371 (c)(1),
(2) Date: Jan. 30, 2020

(87) PCT Pub. No.: WO2019/028672
PCT Pub. Date: Feb. 14, 2019

(65) Prior Publication Data
US 2020/0170095 A1    May 28, 2020

(51) Int. Cl.
*H05B 47/19* (2020.01)
*F21S 4/28* (2016.01)
(Continued)

(52) U.S. Cl.
CPC ............... *H05B 45/20* (2020.01); *F21S 4/28* (2016.01); *G06F 3/167* (2013.01); *H05B 47/12* (2020.01);
(Continued)

(58) Field of Classification Search
CPC ........ H05B 45/20; H05B 47/12; H05B 47/19; F21S 4/28; F21Y 2103/33; F21Y 2115/10; Y02B 20/40
See application file for complete search history.

(56) References Cited

U.S. PATENT DOCUMENTS 9,313,575 B2 *   4/2016   Wang ..................... H04M 3/56
9,717,132 B2     7/2017   Sun et al.
(Continued)

FOREIGN PATENT DOCUMENTS

CN        1707375 A        12/2005
CN     202488806 U    *   10/2012
(Continued)

OTHER PUBLICATIONS

International Search Report and the Written Opinion of the International Searching Authority, or the Declaration from International Appl. No. PCT/CN2017/096411, dated May 16, 2018.
(Continued)

*Primary Examiner* — Jimmy T Vu
(74) *Attorney, Agent, or Firm* — Wood IP LLC

(57) ABSTRACT

Voice activated lighting apparatus, methods and systems are described. In an embodiment, a voice activated lighting apparatus includes a housing that encloses a WiFi module operably connected to a multipoint control unit (MCU), at least one microphone, at least one speaker component, and at least one wireless communication module. Also included is a lighting component operably connected to the MCU which includes at least a first group of light-emitting diodes (LEDs) and a second group of LEDs that are separately controllable by the MCU. In some implementations, the first group of LEDs are controllable via voice commands of a
(Continued)

user to provide illumination, and the second group of LEDs are controllable via voice commands of the user to provide at least one indication.

17 Claims, 8 Drawing Sheets

(51) Int. Cl.
*H05B 45/20* (2020.01)
*H05B 47/12* (2020.01)
*G06F 3/16* (2006.01)
*F21Y 103/33* (2016.01)
*F21Y 115/10* (2016.01)

(52) U.S. Cl.
CPC .......... *H05B 47/19* (2020.01); *F21Y 2103/33* (2016.08); *F21Y 2115/10* (2016.08)

(56) References Cited

U.S. PATENT DOCUMENTS

| | | | |
|---|---|---|---|
| 9,805,575 B2 | 10/2017 | Sun et al. | |
| 9,875,740 B1* | 1/2018 | Kumar | G10L 15/10 |
| 10,204,622 B2* | 2/2019 | Bargetzi | G10L 15/30 |
| 10,271,395 B2* | 4/2019 | Tang | H04N 9/3155 |
| 10,535,343 B2* | 1/2020 | Mixter | H04N 21/4722 |
| 10,733,995 B2* | 8/2020 | Kim | G06F 3/167 |
| 2009/0103228 A1 | 4/2009 | Elderbaum | |
| 2013/0114826 A1 | 5/2013 | Chang | |
| 2014/0376747 A1 | 12/2014 | Mullet | |
| 2015/0168931 A1 | 6/2015 | Jin | |
| 2015/0312989 A1* | 10/2015 | Wee | H05B 45/385 |
| | | | 315/153 |
| 2016/0227633 A1* | 8/2016 | Sun | H05B 45/30 |
| 2016/0323977 A1* | 11/2016 | Sun | H05B 47/11 |

FOREIGN PATENT DOCUMENTS

| | | | | |
|---|---|---|---|---|
| CN | 203249148 U | | 10/2013 | |
| CN | 103870403 A | | 6/2014 | |
| CN | 103874292 A | | 6/2014 | |
| CN | 104378886 A | | 2/2015 | |
| CN | 105681207 A | | 6/2016 | |
| CN | 105785773 A | | 7/2016 | |
| CN | 106023566 A | | 10/2016 | |
| CN | 106168353 A | | 11/2016 | |
| CN | 205793533 U | * | 12/2016 | |
| CN | 205793533 U | | 12/2016 | |
| CN | 106887110 A | | 6/2017 | |
| CN | 107148114 A | * | 9/2017 | F21V 33/0052 |
| WO | 2019/028672 A1 | | 2/2019 | |

OTHER PUBLICATIONS

Second Office Action and Supplementary Search Report for Chinese Patent Appl. No. 201780093742.5, dated Feb. 11, 2022, 15 pages.

* cited by examiner

MULTI-PURPOSE VOICE ACTIVATED LIGHTING APPARATUS

FIELD OF THE INVENTION

The present disclosure generally relates to a voice activated lighting apparatus configured for multiple uses. More particularly, in some embodiments a voice activated table lamp includes components which allow a user to control light source output and to control various indication features. In addition, such a voice activated lamp can operate as a home bridge device, which permits the user to wirelessly or remotely control, and/or wirelessly obtain data from, other electronic devices.

BACKGROUND

Various electronic products are currently available that include wireless connectivity and/or wireless communication functions. In many cases, such wireless electronic products have replaced items that utilized cumbersome wires or cables.

Currently, manufacturers are introducing light bulbs and/or light sources that utilize light emitting diodes (LEDs) because LEDs generally provide advantages in energy conservation, environmental protection, controllable lighting, and have a long operational lifetime. Consequently, LED lamps or LED light fixtures have been produced and widely used in various areas for public, commercial, and/or consumer lighting needs, in both indoor and outdoor lighting environments. For example, an LED light bulb is currently available that provides the same light output as a 60-watt incandescent bulb using much less power (typically on the order of less than 10 watts), which lasts much longer, and which features Bluetooth control capability (for example, via a lighting application provided on a consumer's mobile telephone) for On/Off and/or dimming operations. In addition, the lighting application can be utilized to create custom lighting scenes for the LED light bulb (i.e., the LED light bulb can be configured to produce a particular light output called "Movie Time", a different light output for a "Wake Up" time designated by the user, and yet another light output for a "Homework Hour" time of day, and the like).

Smart home control systems are currently being offered that include a smart home control device which can be used to manage a network of electronic devices and/or household appliances. Such smart home control devices often include a residential gateway device connected to an external network. The residential gateway device may be operably connected to other devices and/or components such as a home central controller, an audio or video acquisition controller, an intelligent access controller, a lighting controller, a home appliance controller, home environmental sensors, a home alarm, an actuator and a network connector, through a wired or wireless network connection. The consumer can then configure a variety of sensors, controllers, actuators and recognition devices related to the home environment and/or to his or her home appliances (either by wired or wireless connections) and then obtain real-time manual and/or automatic control of household devices.

However, the various controllers and sensors associated with current smart home control systems typically require separate wiring and/or proprietary connections, and in many cases are difficult and/or complex to install and to maintain. Therefore, it would be advantageous to provide a voice-activated light fixture for consumer use that not only can provide light, but that can also be utilized as a hub device to control and/or obtain data from other electronic devices.

BRIEF SUMMARY OF THE INVENTION

Disclosed are voice activated lighting apparatus, methods and systems. In an embodiment, a voice activated lighting apparatus includes a housing that encloses a WiFi module operably connected to a multipoint control unit (MCU), at least one microphone, at least one speaker component, and at least one wireless communication module. Also included is a lighting component operably connected to the MCU which includes at least a first group of light-emitting diodes (LEDs) and a second group of LEDs that are separately controllable by the MCU. In some implementations, the first group of LEDs are controllable via voice commands of a user to provide illumination, and the second group of LEDs are controllable via voice commands of the user to provide at least one indication.

In some embodiments, a voice activated lighting apparatus process includes receiving, by at least one microphone of a voice activated lighting apparatus, audio input from a user and translating the audio input into a command. A WiFi module then transfers the command to a Bluetooth Low Energy (BLE) module, which transmits the command to an external electronic device. The WiFi module then receives, via the BLE module, electronic device data from the external electronic device indicative of a command control operation, and transmits the electronic device data to a device cloud for at least one of storage and analysis.

In another implementation, a voice activated hub system includes a voice service cloud, a device cloud operably connected to the voice service cloud, and a voice activated lighting apparatus operably connected to the voice service cloud and to the voice service cloud. In some embodiments, the voice activated lighting apparatus includes a housing that encloses a WiFi module which is operably connected to a multipoint control unit (MCU), at least one microphone, at least one speaker component, and at least one wireless communication module, and a lighting component operably connected to the MCU. In an implementation, the lighting component includes at least a first group of light-emitting diodes (LEDs) and a second group of LEDs that are separately controllable by the MCU, wherein the first group of LEDs are controllable via voice commands of a user received by the at least one microphone and processed by the WiFi module to provide illumination, and the second group of LEDs are controllable via voice commands of the user received by the at least one microphone and processed by the WiFi module to provide at least one indication.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments (not necessarily drawn to scale), wherein.

DETAILED DESCRIPTION

Figure 1B:
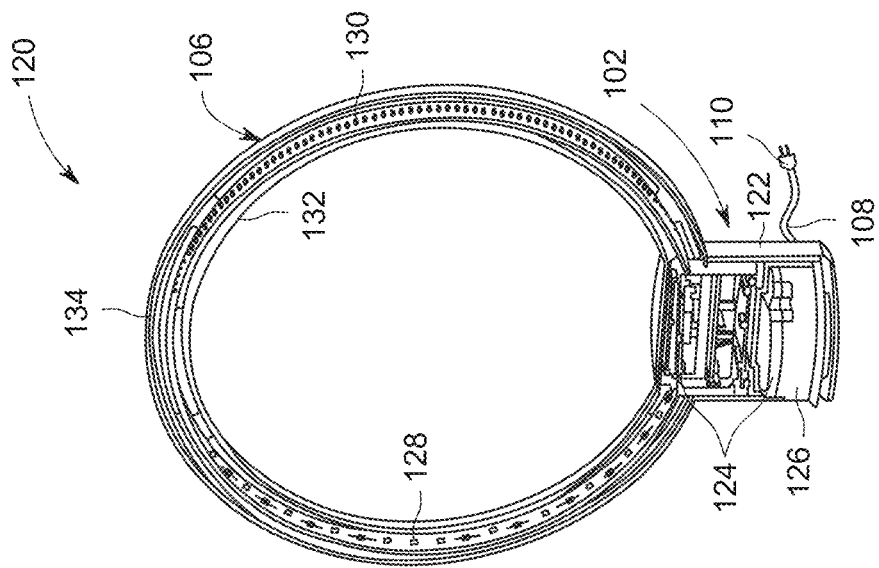
FIG. 1B is a cutaway perspective view of the voice activated lighting apparatus of FIG. 1A.

Reference now will be made in detail to illustrative embodiments, one or more examples of which are illustrated in the drawings. Like components and/or items in the various drawings are identified by the same reference number, and each example is provided by way of explanation only and thus does not limit the invention. In fact, it will be apparent to those skilled in the art that various modifications and/or variations can be made without departing from the scope and/or spirit of the invention. For instance, in many cases features illustrated or described as part of one embodiment can be used with another embodiment to yield a further embodiment. Thus, it is intended that the present disclosure covers such modifications and variations as come within the scope of the appended claims and their equivalents.

Figure 1A:
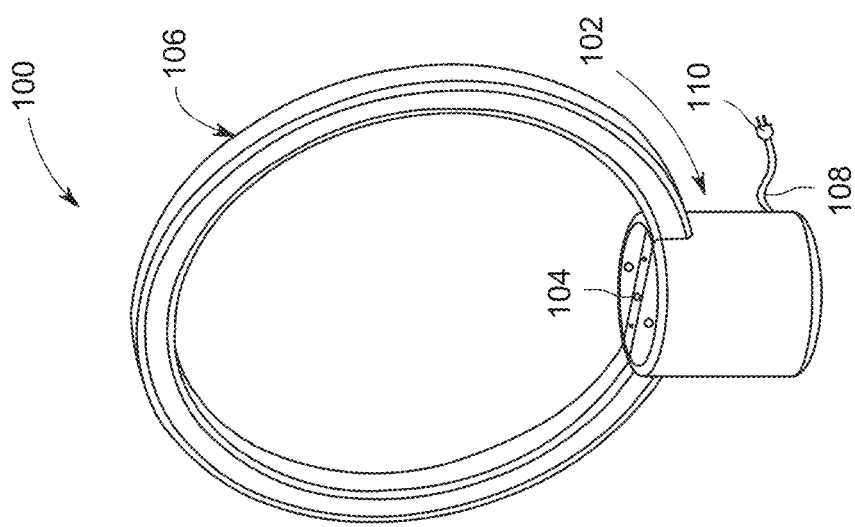
FIG. 1A is a perspective view of an embodiment of a voice activated lighting apparatus in accordance with some embodiments of the disclosure.

FIG. 1A is a perspective view of a voice activated, multi-purpose table lighting apparatus 100 in accordance with some embodiments. The voice activated table lighting apparatus 100 includes a base 102 having a control panel 104 on a top portion, and a loop lighting component 106 operably connected to the base. In some implementations, a voice activated table lamp (or lighting apparatus) may include a power cord 108 with a conventional wall plug 110 for use in providing electrical power to one or more of the light sources (shown in FIGS. 1B and 1C) within the loop lighting component. However, battery-powered implementations are contemplated.

Figure 1C:
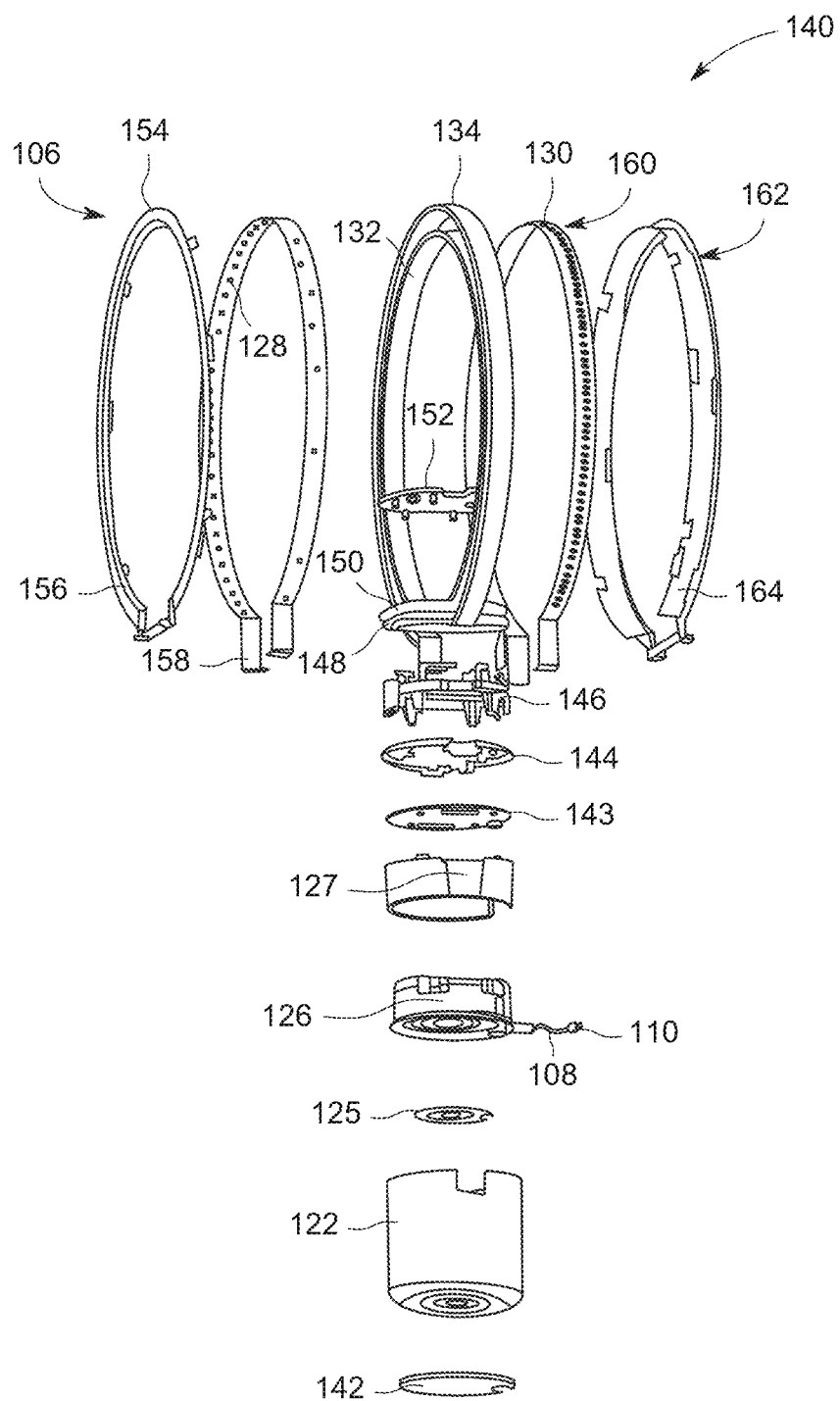
FIG. 1C is an exploded view of the voice activated lighting apparatus of FIGS. 1A and 1B.

FIG. 1B is a cross-sectional view 120, and FIG. 1C is an exploded view 130, of the voice activated table lighting apparatus 100 of FIG. 1A. Referring to FIG. 1B, the base 102 includes a housing 122 that protects various internal components and/or circuitry 124 and a speaker module 126. The components and/or circuitry 124 may include, for example, a control board that includes at least one controller, a driver board, one or more microphones, and various support structures. The base 102 also supports and is operably connected to the loop lighting component 106, which includes an inner ring of light-emitting diodes (LEDs) 128, an outer ring of light-emitting diodes (LEDs) 130, an inner lens 132 and an outer lens 134. It should be noted that, although the base 102 shown in FIGS. 1A-1C is of a generally cylindrical shape, the base 102 may be of other shapes.

As mentioned above, FIG. 1C is an exploded view 140 of the voice activated table lighting apparatus 100 of FIG. 1A, and further illustrates the elements of the base 102 and loop lighting component 106. In some embodiments, the base 102 includes a non-slip mat 142, the housing 122, a clump plate 125, the speaker module 126, a speaker module enclosure 127, a septum 142, a driver board 144, a support structure 146, a control board 148, an interface board 150, and a control panel 152. In some implementations, the loop lighting component 106 is operably connected to the interface board 150 and to the control board 148. In the present implementation, the loop lighting component includes a first side cover 154 with an associated first portion of a heat sink 156, an inner LED board 158 that includes the inner ring of LEDs 128, the inner lens 132 and outer lens 134, an outer LED board 160 that includes the outer ring of LEDs 130, and the second side cover 162 with an associated second portion of the heat sink 164. Each of the first side cover 154, the second side cover 162, the inner lens 132 and the outer lens 134 may be made of a translucent or transparent plastic material or the like, which permits light from the inner ring of LEDs 128 and from the outer ring of LEDs 130 to pass through. In some implementations, the inner ring of LEDs 128 may be configured for displaying multiple colors of light, which may provide indications of various types of events (which will be explained below), whereas outer ring of LEDs 130 may be dimmable and configured for emitting primarily white light to illuminate, for example, a room or other space.

Figure 1D:
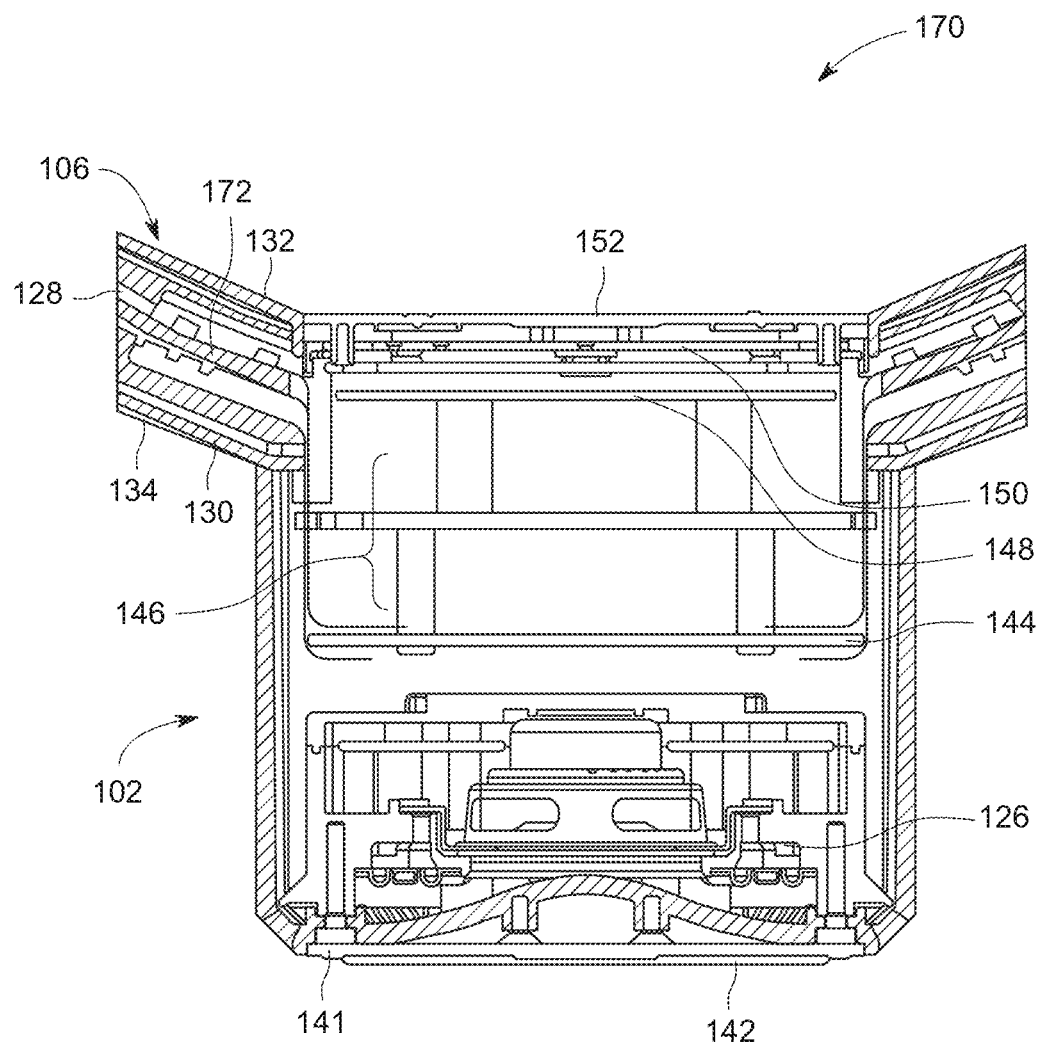
FIG. 1D is an enlarged, cross-sectional view of the base and portions of the loop lighting component of the voice activated lighting apparatus of FIGS. 1A, 1B and 1C.

FIG. 1D is an enlarged, cross-sectional view 170 of the base 102 and a cutaway view of the lower portions of the loop lighting component 106 in accordance with some embodiments. A portion of loop lighting component 106 is shown, and below the inner lens 132 is the inner ring of LEDs 128, the heat sink 172 (which is composed of the first portion of the heat sink 156 and the second portion of the heat sink 164 shown in FIG. 1C), the outer ring of LEDs 130, and the outer lens 134. The base 102 includes the non-slip mat 142 below a bottom wall 141, the speaker module 126, and the support structure 146 which supports the driver board 144 and the control board 148. Also shown is the interface board 150 which is located below the control panel 152. In some implementations, the control panel 152 includes tactile controls and one or more sensors and/or one or more microphones for obtaining voice commands or audio commands from a person or user.

Figure 2:
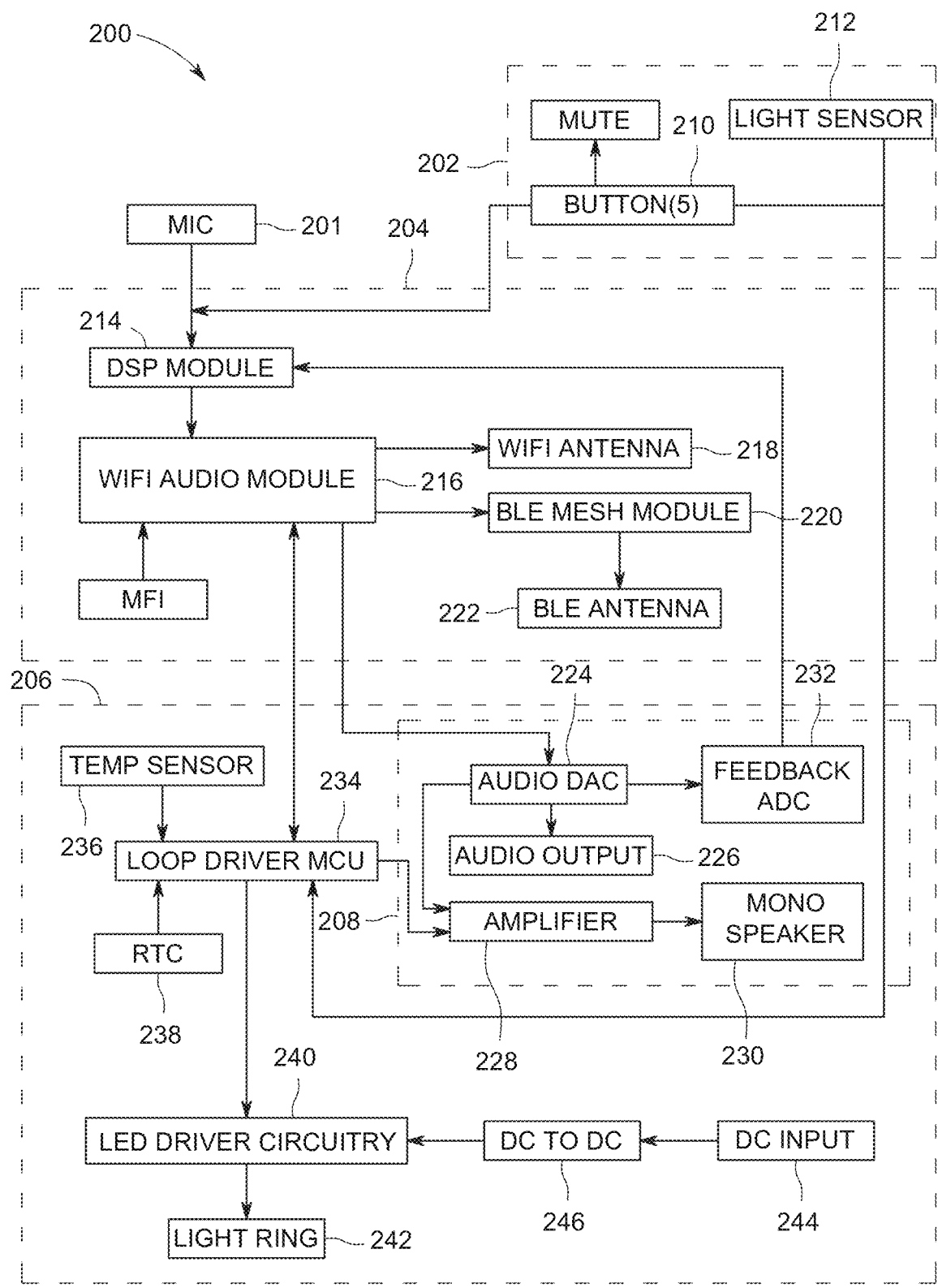
FIG. 2 is a voice activated lighting apparatus block diagram in accordance with some embodiments of the disclosure.

FIG. 2 illustrates a voice activated lighting apparatus block diagram 200 in accordance with some embodiments. The implementation shown in FIG. 2 includes several printed circuit (PC) boards, including an interface board 202 which is operably connected to a control board 204, and wherein the control board 204 is operably connected to a drive board 206. The drive board 206 includes an audio board 208, and in the implementation shown in FIG. 2, a separate microphone 201 is connected to a digital signal processor (DSP) voice module 214 of the control board. However, some implementations may include all of the components on one printed circuit board, and it should be understood that different types of components could be utilized in different arrangements to provide equivalent functionality.

Referring again to FIG. 2, the interface board 202 may include one or more tactile button(s) 210, which may be utilized by a person or user, for example, to mute an audio output. The interface board 202 may also include one or more sensor(s) 212, such as a light sensor, wherein the sensor 212 is operably connected to circuitry in the driver board 206. The control board 204 may include a digital signal processor (DSP) voice module 214 that provides enhanced automatic speech recognition (ASR) system performance, and a WiFi audio module 216 is shown operably connected to a WiFi antenna 218. The WiFi audio module 216 is also operably connected to a Bluetooth Low-Energy (BLE) mesh module 220, which may be connected to a BLE antenna 222.

As mentioned above, the diver board 206 may contain an audio board 208 having components operably connected to the DSP module 214 and to the WiFi Audio module 216 of the control board 204. In particular, the audio board 208 includes an Audio Digital to Analog Converter (DAC) 224 operably connected to an audio output 226 and to an amplifier 228, which amplifier is connected to a monaural speaker 230. The audio board 204 also includes a feedback Analog to Digital Converter (ADC) operably connected to the DSP module 214 of the control board.

In some embodiments, the Driver board 206 includes a Loop Driver multipoint control unit (MCU) 234 which is operably connected to the amplifier 228 of the audio board 206 and to the WiFi Audio module 216 of the control board 204. In some implementations, the Loop Driver MCU 234 receives input from the microphone 201 via the DSP module 214 and the WiFi Audio module 216, input from the sensor 212 of the interface board 201, input from a temperature sensor 236, and input from a real-time clock (RTC) 238. In response, the Loop Driver MCU 234 may provide operational or control signals to the LED driver circuitry 240, which in turn operates the light ring 242 (i.e. controls the illumination of the inner ring of light-emitting diodes (LEDs) and/or of the outer ring of LEDs of the loop lighting component 106 shown in FIGS. 1A-1D). In some embodiments, a direct current (DC) input component 244, and a DC to DC component 246, are utilized to provide power to the LED driver circuitry 240 for use in controlling the LEDs of the loop ring lighting component 106.

Figure 3:
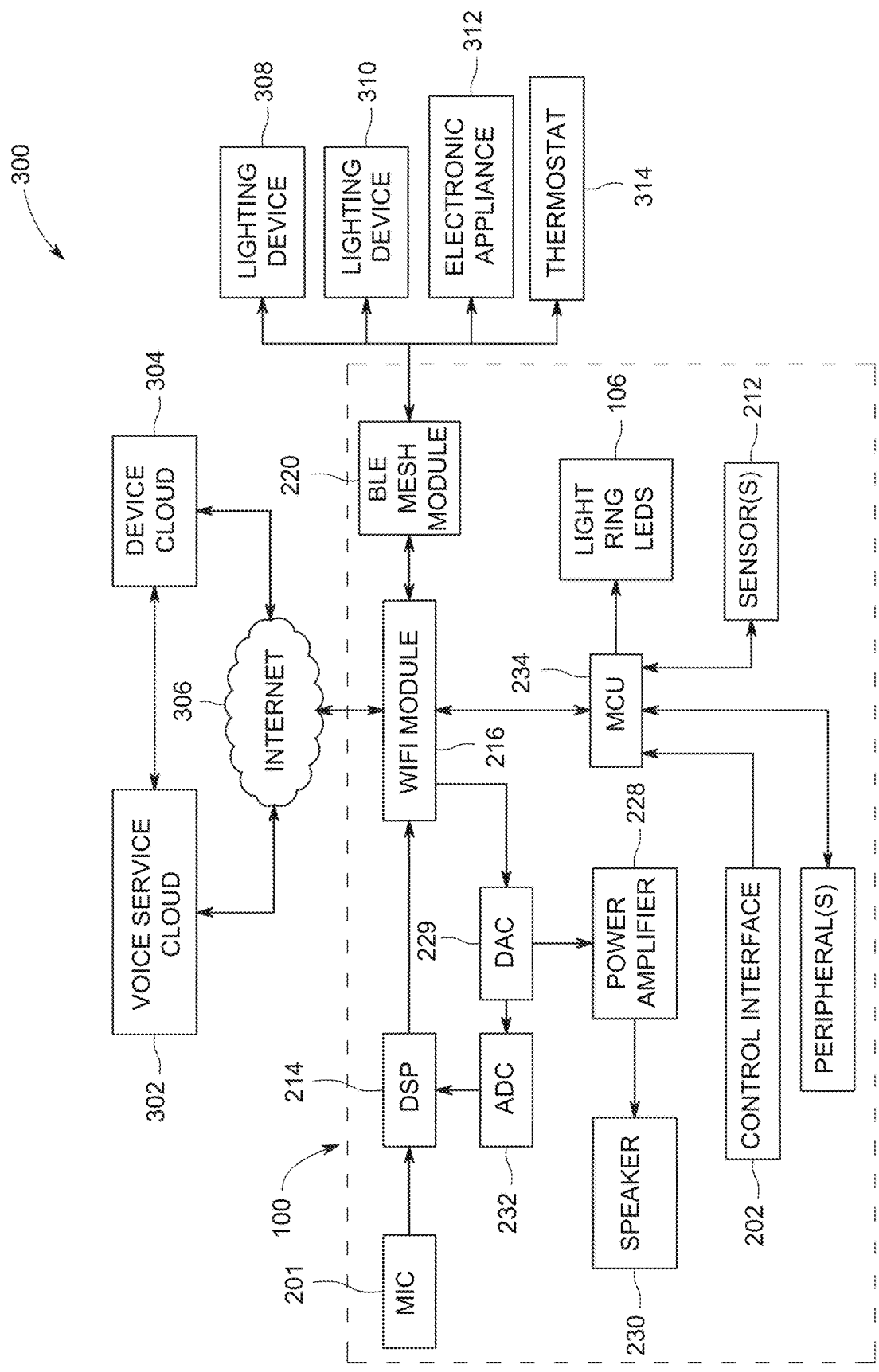
FIG. 3 illustrates a voice activated hub system in accordance with some embodiments of the disclosure.

FIG. 3 illustrates a voice activated hub system 300 in accordance with some embodiments. In the example shown in FIG. 3, the voice activated lighting apparatus 100 is configured for communications with a voice cloud service 302 and a device cloud 304 via the Internet 306. In some embodiments, one or more microphones 201 of the voice activated lighting apparatus is always in the ON state so as to detect any voice instructions or voice commands from a user, or audio instructions from another device. In some implementations, the voice activated lighting apparatus can perform tasks locally, like turning the LEDs of the light ring 106 On and OFF, or making the LEDs blink in a pattern. But in embodiments disclosed herein, the voice activated lighting apparatus 100 can be used as a voice activated hub device (VAHD) to provide control to a user of not just the LEDs of the lamp, but also of other electronic devices that are configured for receiving wireless communications. For example, the VAHD 100 can be configured for user control of a first lighting device 308, a second device 310, an electronic appliance 312 (such as a refrigerator or blue tooth speaker), and a thermostat 314, which may all be located in a user's home.

In some implementations, for example, when the microphone 201 of the voice activated lighting apparatus 100 recognizes a "wake" word, then the words voiced by the user are recorded and then transmitted (when the user stops talking) by the WiFi module 216 via the Internet 306 to the voice service cloud 302. For example, the wake word may be "Alexa," which is associated with the Alexa Voice Services (AVS), which is a cloud-based service owned and operated by the Amazon.com™ company, or may be some other wake word utilized by other cloud voice services provided by another company or entity such as Microsoft™ or Google™

Referring again to FIG. 3, upon receipt of the words spoken by the user, the voice service cloud 302 translates or interprets the audio words spoken by the user into one or more commands, and then transmits the command(s) back to the WiFi module 216. The WiFi module may then route the command to the MCU 234 (for control of the light ring LEDs 106) and/or to the BLE mesh module 220 for transmission to one or more other electronic devices. In some implementations, one or more processors (not shown) of the voice activated lighting apparatus 100 are configured for interpreting and/or translating a user's spoken words locally (i.e. without the WiFi module 216 transmitting the spoken words via the Internet 306 to the voice service cloud 302).

Accordingly, in some embodiments, after the user's spoken words have been interpreted and/or translated into one or more commands, the BLE mesh module 220 transmits one or more of the commands to one or more of the first lighting device 308, the second lighting device 310, the electronic appliance 312, and the thermostat 314. In addition, the BLE mesh module 220 may receive a confirmation message (or other types of information or data) from one or more first lighting device 308, the second lighting device 310, the electronic appliance 312, and the thermostat 314. Any such data received by the BLE mesh module 220 is provided to the WiFi module 216, and then transmitted via the Internet to the Device cloud 304 for analysis and/or storage.

Accordingly, a voice activated wireless protocol can be utilized for communications between the voice activated lighting apparatus 100 (or voice activated hub device (VAHD)) and various other smart home devices. For example, the user can ask the VAHD 100 to "turn on the living room lights" and then that sentence is recorded and sent to the voice service cloud 302, which translates it into one or more commands and transmits the commands back to the WiFi module 216. The WiFi module then transfers the commands to the BLE mesh module 220 for transmission to both the first light device 308 and the second lighting device 310. One or both of the living room lights may then send a confirmation message back to the VAHD 100, which in some implementations and/or protocols, transmits such confirmation messages (and perhaps additional data) to the device cloud 304.

In some implementations, the VAHD 100 could also be used by a person to access online services, which in some cases must be linked to by the user beforehand. For example, the user may link the VAHD 100 to a local pizza restaurant (for example, by going online and registering his or her name, address, telephone number and form of payment at the pizza restaurant website), and then afterwards would be able order a pizza by using his or her voice. In another example, the user or consumer may be able to order merchandise from an online merchant via voice command, for example items from Amazon.com, if he or she has an account with the merchant that includes his or her residence address and payment details.

Referring again to FIG. 3, the voice service cloud 302 and the device cloud 304 may also be in communication with each other, and may provide instructions and/or information and/or data concerning one or more voice activated hub devices (VAHDs) 100. Such data may be utilized for analysis purposes, for example, to determine how a particular VAHD is being used, and could be used to make changes and/or improvements to the software and/or firmware to improve VAHD operation.

Figure 4A:
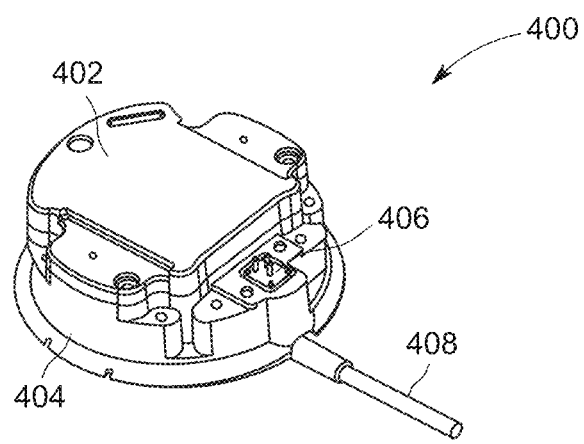
FIGS. 4A to 4F illustrate a modularized speaker subsystem for use in the voice activated lighting apparatus of FIGS. 1A-1D in accordance with some embodiments of the disclosure.
Figure 4B:
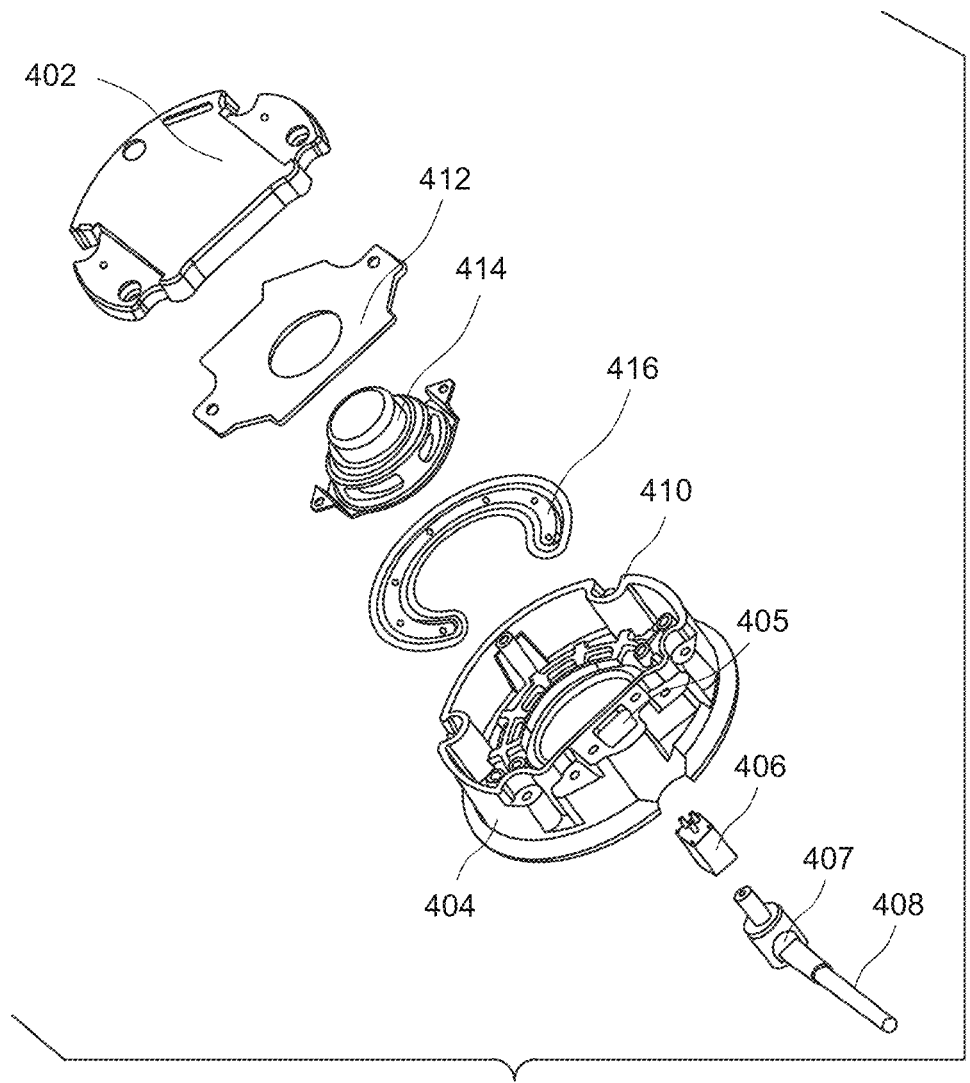

FIGS. 4A to 4F illustrate an embodiment of a modular speaker subsystem 400 that may be utilized in the voice activated light fixture 100 in accordance with the present disclosure. FIG. 4A is a top perspective view and FIG. 4B is an exploded view of the modular speaker subsystem 400. In some embodiments, the modular speaker subsystem 400 includes a generally circular upper housing portion 402 and a lower housing portion 404 (which includes an interior speaker compartment). Also shown is an upper plug component 406 which is internally connected to a lower plug component 407 (shown in FIG. 4B) associated with a power cord 408.

FIG. 4B is an exploded perspective view of the modular speaker subsystem 400. In some embodiments, a generally circular upper housing portion 402 is configured for attachment to a lower housing portion 404, which includes a compartment 405 for seating an upper plug component 406. The upper plug component 406 is configured for connection to a lower plug component 407 that is associated with the power cord 408. A speaker driver board 412, speaker driver 414 and a passive radiator 416 are all seated within an interior housing portion 410 when the modular speaker subsystem if fully assembled. When the modular speaker subsystem 400 is fully assembled, the upper housing portion 402 and the clump plate 125 (shown in FIG. 1C) encapsulate the interior housing portion 410 of the lower housing 404 to form and/or define an acoustic chamber.

Figure 4C:
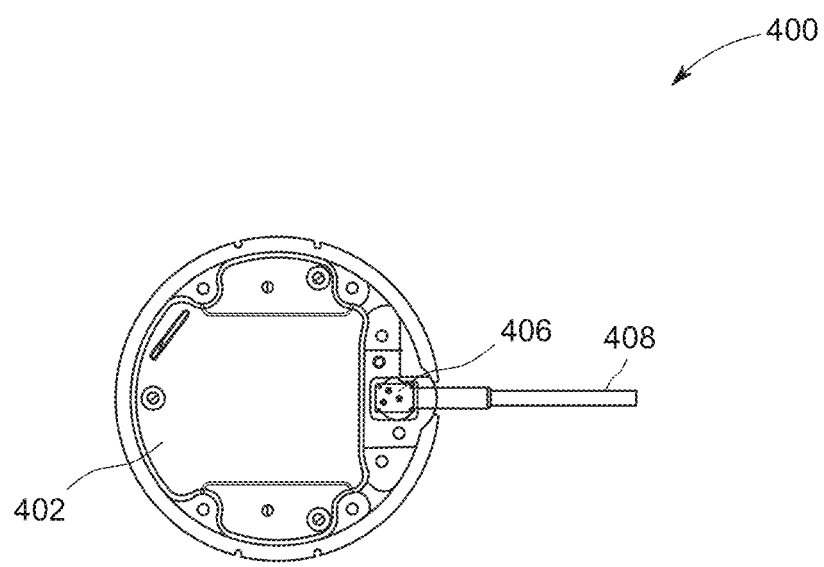
Figure 4D:
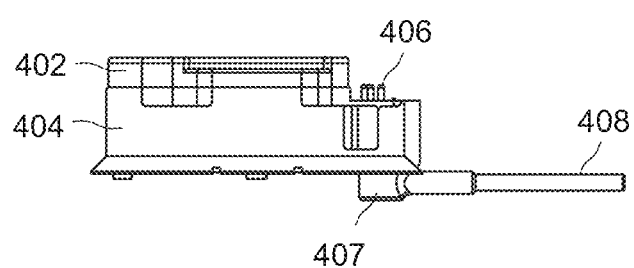
Figure 4E:
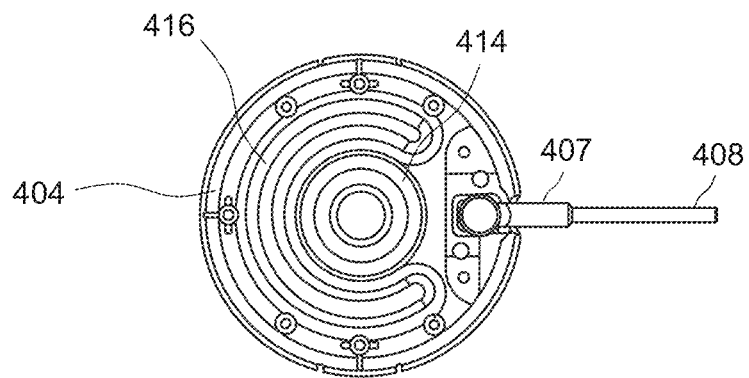
Figure 4F:
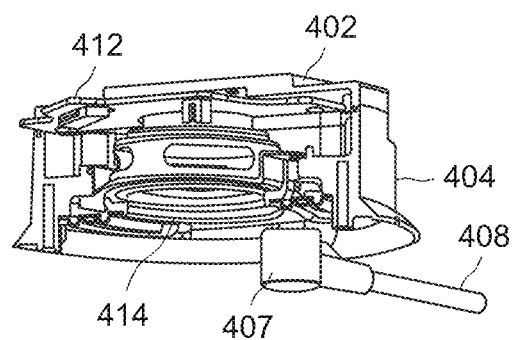

FIG. 4C is a top view of an assembled modular speaker subsystem 400 showing details of the upper housing portion 402, the upper plug component 406, and power cord 408. FIGS. 4D and 4E are side and bottom views, respectively, of the assembled modular speaker subsystem 400 showing the upper housing portion 402, lower housing portion 404, the upper plug component 406, lower plug component 407, power cord 408, the speaker driver 414 and the passive radiator 416. FIG. 4F is a is a cutaway side view of an assembled the modular speaker subsystem 400 to illustrate the placement of the speaker driver board 412 and the generally circular speaker driver 414 within the upper housing 402 and lower housing 404. The interior housing portion or acoustic chamber 410 facilitates testing of the acoustic characteristics of the speaker driver 414. In addition, the modular speaker subsystem 400 facilitates and/or simplifies assembly of the voice activated hub device (VAHD) 100 or voice activated lighting apparatus.

The voice activated lighting apparatus 100 (or the voice activated hub device (VAHD)) includes a number of connectivity features. In particular, in embodiments disclosed herein, the VAHD 100 is configured for Bluetooth Low-Energy (BLE) Mesh and WiFi dual mode operation, to communicate with home electronics devices, the voice services cloud system, and the device cloud system. In some implementations, the VAHD 100 can operate in a tri-mode configuration, or as a dual WiFi System. For example, a user could utilize the VAHD 100 to control light output, to control indicator lamp messages, and to control other electronic devices at the same time or at different times. Thus, an attraction for users to purchase such a voice activated lighting apparatus is so that they can use it not only as a lighting apparatus, but also as a home bridge for voice activated control of their various other home electronics appliances. Some embodiments described herein may also include advanced and/or proprietary microphone and speaker integration circuitry and/or application features for enhanced language recognition and feedback.

Thus, the user can control various features of voice activated table lighting apparatus 100, including the capability of changing the correlated color temperature (CCT) of the outer ring of LEDs (which means being able to change the specification of the color appearance of the emitted light as related to a reference source when heated to a particular temperature that is measured in degrees Kelvin (K). In some implementations, instead of voicing a detailed technical color temperature command, the user may be able to utilize a voice phrase such as "loop light warmer" to result in an incremental decrease in the color temperature of the light output of the outer ring of LEDs. Other examples of lighting commands could include "loop light darker" and/or "loop light redder" and the like. The user may also be able to control the color output and/or color mixing of the inner ring of LEDs, and could use voice phrases such as "inner loop rainbow" to command each LED of the inner ring of LEDs to change colors in a particular pattern. In some implementations, the inner ring of LEDs may provide feedback indications to the user in the form of one or more particular color displays by the LEDs which may indicate, for example, the completion of various operations and/or functions.

In some embodiments, the voice activated lighting apparatus 100 (or the voice activated hub device (VAHD)) may include various audio/visual response features. For example, the voice activated lighting apparatus 100 may include the capability and/or components for providing specialized bedtime audio output, such as a white noise generator or a seashore sounds (the sound of waves on a beach, etc.) generator, and the capability to play music selected by the user. For example, the user or consumer may use a music service, such as Spotify™ or Amazon Music™, to find music of a favorite musical group or band to play. The voice activated lighting apparatus 100 may also include an alarm and/or an intercom to other devices. A camera may also be included, which may be configured for integration with an application such as Facetime, and/or for use as a "Nanny Cam" and/or to monitor a pet, and/or to provide security via a facial recognition profile. In some contemplated embodiments, components may be included in the loop portion of the lighting apparatus configured for projecting a hologram in the center of the ring.

A voice activated lighting apparatus 100 in accordance with embodiments described herein may also include information feedback features. For example, the inner ring of LEDs may function as a status indicator with regard to weather updates, garage door and/or any house door status (open or closed), budget tracking, cell phone usage, smart phone notifications, stock market portfolio performance, and the like. Time trigger events could also be indicated by using the inner ring of LEDs, for example, as a countdown time and/or as a clock. Thus, various different types of light displays, which may involve color changes and/or individual LED light emitting changes (ON, OFF and/or Dimming) could be utilized, and could be used in association with audio indications or prompts utilizing the built-in speaker 126 (See FIGS. 1A-1D).

In addition, a voice activated lighting apparatus 100 in accordance with embodiments described herein may also include sensor-based features. For example, the voice activated lamp or VAHD may include one or more sensors operable to detect water, smoke and fire, carbon monoxide and/or natural gas, and seismic shocks (earthquakes). Sensors or other components may also be provided that can indicate biological events, such as detecting snoring, detect pathogens in the air, monitor an infant's vital signs, and provide an air quality analysis.

Thus, various embodiments described herein advantageously permit a user or consumer to utilize the voice activated lighting apparatus 100 as a hub or home gateway device so as to enable voice control of other electronic devices. In addition, various features allow the user to advantageously control lighting effects, and to be receive visual and/or audio indications which may affect the security and/or well-being of the user. Some embodiments may also include additional features or aspects, such as one or more biological sensors, for example, to detect changes in the environment and alert the user to such changes.

Accordingly, a voice-activated lighting apparatus in accordance with the present disclosure is a "talking" lamp fixture that allows a person or consumer to speak words to control the operation of the lighting apparatus fixture (such as On/Off commands, light color changing and/or dimming commands, and the like). In addition, the consumer can speak words to control other WiFi-capable appliances and/or devices by utilizing a web-enabled voice service, such as AVS or Google home. Research has shown that consumers enjoy using verbal commands for controlling lamps and/or other devices because doing so is intuitive and provides a better customer experience as compared to the typical phone-app or computer software based controls.

In addition, a voice-activated lighting apparatus (or lamp fixture) in accordance with the disclosure may self-embed a BLE/WiFi gateway function that allows consumers to use the lighting apparatus as a household gateway for controlling other BLE mesh-capable smart appliances and/or devices. The integrated gateway feature eliminates the need to purchase and install a separate, stand-alone gateway device that is often required in order to remotely control other BLE mesh capable devices and/or appliances.

The inner ring of the disclosed voice-activated light fixture includes an inner ring that provides indication lights, which can be correlated with specific voice commands or voice services to produce a number of light pattern indications to signal different events, which may be at the direction of the consumer. For example, the inner ring of indication lights may provide a count-down function for an event that is important to the consumer, such as the starting time of a sporting event or the like.

The above descriptions and/or the accompanying drawings are not meant to imply a fixed order or sequence of steps for any process or method of manufacture referred to herein. Thus, any disclosed process may be performed in any order that is practicable, including but not limited to simultaneous performance of one or more steps that are indicated as sequential.

Although the present invention has been described in connection with specific exemplary embodiments, various changes, substitutions, modifications and/or alterations apparent to those skilled in the art can be made to the disclosed voice activated lighting apparatus and/or voice activated lamp system embodiments without departing from the spirit and scope of the invention as set forth in the appended claims.

What is claimed is:

1. A voice activated lighting apparatus, comprising:
 a housing comprising a WiFi module operably connected to a multipoint control unit (MCU), at least one microphone, at least one speaker component, and at least one wireless communication module;
 a lighting component operably connected to the MCU, the lighting component comprising at least a first group of light-emitting diodes (LEDs) and a second group of LEDs that are separately controllable by the MCU;
 wherein the first group of LEDs are controllable via voice commands of a user received by the at least one microphone and transmitted by the WiFi module to the MCU to provide illumination, and the second group of LEDs are controllable via voice commands of the user received by the at least one microphone and transmitted by the WiFi module to the MCU to provide at least one indication.

2. The voice activated lighting apparatus of claim 1, wherein at least one external device is controllable via voice commands of the user received by the at least one microphone and transmitted by the WiFi module.

3. The voice activated lighting apparatus of claim 1, wherein the wireless communication module comprises at least one of a Bluetooth low energy (BLE) mesh protocol and a Zigbee protocol.

4. The voice activated lighting apparatus of claim 1, further comprising at least one control interface comprising at least one touch sensitive controller operable by the user to control at least one function of the voice activated lighting apparatus.

5. The voice activated lighting apparatus of claim 1, further comprising at least one sensor for providing sensor data accessible via a voice command of a user received by the at least one microphone and transmitted by the WiFi module to the MCU.

6. The voice activated lighting apparatus of claim 1, wherein the color of the first group of LEDs can be controlled by voice command of the user received by the at least one microphone and transmitted by the WiFi module.

7. The voice activated lighting apparatus of claim 1, wherein the color displayed by the second group of LEDs can be controlled by voice command of the user received by the at least one microphone and transmitted by the WiFi module.

8. The voice activated lighting apparatus of claim 1, wherein the at least one speaker component comprises a modular speaker subsystem configured for simplifying assembly of the voice activated lighting apparatus, the modular speaker subsystem comprising a housing, a speaker driver board, a speaker driver and a passive radiator, wherein the housing is formed to provide an acoustic chamber and to provide at least one mechanical attachment mechanism.

9. The voice activated lighting apparatus of claim 1, wherein the lighting component comprises a loop lighting component, and wherein the first group of light-emitting diodes (LEDs) comprises an inner ring LEDs and the second group of LEDs comprises an outer ring of LEDs.

10. A voice activated hub system comprising:
 a voice service cloud;
 a device cloud operably connected to the voice service cloud; and
 a voice activated lighting apparatus operably connected to the voice service cloud and to the voice service cloud;
 wherein the voice activated lighting apparatus comprises:
  a housing comprising a WiFi module operably connected to a multipoint control unit (MCU), at least one microphone, at least one speaker component, and at least one wireless communication module; and
  a lighting component operably connected to the MCU, the lighting component comprising at least a first group of light-emitting diodes (LEDs) and a second group of LEDs that are separately controllable by the MCU;
 wherein the first group of LEDs are controllable via voice commands of a user received by the at least one microphone, processed by the voice service cloud, and transmitted by the WiFi module to provide illumination, and the second group of LEDs are controllable via voice commands of the user received by the at least one microphone, processed by the voice service cloud, and transmitted by the WiFi module to provide at least one indication.

11. The voice activated hub system of claim 10, further comprising at least one external device controllable by the voice activated lighting apparatus via voice commands of the user received by the at least one microphone, processed by the voice service cloud, and transmitted by the WiFi module.

12. The voice activated hub system of claim 10, wherein the voice activated lighting apparatus further comprises at least one control interface comprising at least one touch sensitive controller operable by the user to control at least one function of the voice activated lighting apparatus.

13. The voice activated hub system of claim 10, wherein the voice activated lighting apparatus further comprises at least one sensor for providing sensor data accessible via a voice command of a user received by the at least one microphone and transmitted by the WiFi module to the MCU.

14. The voice activated hub system of claim 10, wherein the color of the first group of LEDs of the voice activated lighting apparatus can be controlled by voice command of the user received by the at least one microphone and transmitted by the WiFi module.

15. The voice activated hub system of claim 10, wherein the color displayed by the second group of LEDs of the voice activated lighting apparatus can be controlled by voice command of the user received by the at least one microphone and transmitted by the WiFi module.

16. The voice activated hub system of claim 10, wherein the at least one speaker component of the voice activated lighting apparatus comprises a modular speaker subsystem configured for simplifying assembly of the voice activated lighting apparatus, the modular speaker subsystem comprising a housing, a speaker driver board, a speaker driver and a passive radiator, wherein the housing is formed to provide an acoustic chamber and to provide at least one mechanical attachment mechanism.

17. The voice activated hub system of claim 10, wherein the lighting component of the voice activated lighting apparatus comprises a loop lighting component, and wherein the first group of light-emitting diodes (LEDs) comprises an inner ring LEDs and the second group of LEDs comprises an outer ring of LEDs.

* * * * *